(12) United States Patent
Del Prado Pavon et al.

(10) Patent No.: US 7,995,583 B2
(45) Date of Patent: Aug. 9, 2011

(54) APPARATUS AND METHOD FOR ANNOUNCING A PENDING QOS SERVICE SCHEDULE TO A WIRELESS STATION

(75) Inventors: Javier Del Prado Pavon, Ossining, NY (US); Amjad Soomro, Hopewell Junction, NY (US); Kiran Challapali, New City, NY (US); Saishankar Nandagopalan, Tarrytown, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 3203 days.

(21) Appl. No.: 10/314,623

(22) Filed: Dec. 9, 2002

(65) Prior Publication Data

US 2004/0047351 A1 Mar. 11, 2004

Related U.S. Application Data

(60) Provisional application No. 60/409,693, filed on Sep. 10, 2002.

(51) Int. Cl.
*H04L 12/28* (2006.01)
(52) U.S. Cl. .......... 370/395.21; 370/338; 370/311; 370/329; 455/574; 455/452.2
(58) Field of Classification Search .......... 370/345, 370/346, 348, 447–448, 395.21, 338, 311, 370/329, 349, 445, 465, 332; 455/574, 452.2
See application file for complete search history.

(56) References Cited

U.S. PATENT DOCUMENTS

| | | | | |
|---|---|---|---|---|
| 6,463,307 | B1 * | 10/2002 | Larsson et al. | 455/574 |
| 7,330,472 | B2 * | 2/2008 | Kowalski | 370/395.21 |
| 7,349,433 | B2 * | 3/2008 | Ho | 370/469 |
| 7,414,969 | B2 * | 8/2008 | Kandala | 370/230 |
| 7,453,857 | B2 * | 11/2008 | Mangold et al. | 370/338 |
| 7,519,032 | B2 * | 4/2009 | Soomro et al. | 370/338 |
| 7,593,375 | B2 * | 9/2009 | Seo et al. | 370/338 |
| 2002/0071449 | A1 * | 6/2002 | Ho et al. | 370/447 |
| 2002/0093929 | A1 | 7/2002 | Mangold et al. | 370/336 |
| 2002/0122409 | A1 * | 9/2002 | Kandala | 370/348 |
| 2003/0081547 | A1 * | 5/2003 | Ho | 370/229 |
| 2003/0081583 | A1 * | 5/2003 | Kowalski | 370/338 |
| 2003/0091066 | A1 * | 5/2003 | Choi et al. | 370/468 |

(Continued)

FOREIGN PATENT DOCUMENTS

WO 0206986 A2 1/2002

OTHER PUBLICATIONS

"A QoS Aware Power Save Protocol for Wireless Ad Hoc Networks", by L.M. Feeney.

(Continued)

*Primary Examiner* — Salman Ahmed
(74) *Attorney, Agent, or Firm* — Larry Liberchuk

(57) ABSTRACT

An apparatus and method is disclosed for announcing to a wireless station in a wireless network that a Quality of Service (QoS) service schedule is pending for the wireless station. The apparatus of the invention comprises a hybrid coordinator that is capable of creating and sending to the wireless station an announcement of a pending Quality of Service (QoS) service schedule. The wireless station delays entering a power save mode of operation until the wireless station receives the QoS service schedule or until a selected timeout period expires.

18 Claims, 8 Drawing Sheets

U.S. PATENT DOCUMENTS

| | | | |
|---|---|---|---|
| 2003/0093526 A1* | 5/2003 | Nandagopalan et al. | 709/225 |
| 2003/0135640 A1* | 7/2003 | Ho et al. | 709/237 |
| 2004/0042435 A1* | 3/2004 | Soomro et al. | 370/338 |
| 2004/0047351 A1* | 3/2004 | Del Prado Pavon et al. | 370/395.4 |
| 2005/0083838 A1* | 4/2005 | Kandala | 370/230 |
| 2005/0135409 A1* | 6/2005 | Janczak | 370/449 |
| 2006/0023684 A1* | 2/2006 | Seo et al. | 370/338 |
| 2007/0002890 A1* | 1/2007 | Mangold et al. | 370/459 |
| 2007/0104123 A1* | 5/2007 | Tomici et al. | 370/310 |
| 2007/0291725 A1* | 12/2007 | Kowalski | 370/338 |
| 2009/0016247 A1* | 1/2009 | Sood | 370/310 |

OTHER PUBLICATIONS

"Implementation Experiences of Bandwidth Guarantee on a Wireless LAN", by Srikant Sharma et al.

"IEEE 802.11e Wireless LAN for Quality of Service", by Stefan Mangold et al.

\* cited by examiner

OPEN SYSTEMS INTERCONNECTION (OSI) LAYERS

| ELEMENT ID (13) | LENGTH (44) | TS INFO | NOMINAL MSDU SIZE | MAXIMUM MSDU SIZE | MINIMUM SERVICE INTERVAL | MAXIMUM SERVICE INTERVAL | INACTIVITY INTERVAL | MINIMUM DATA RATE |
|---|---|---|---|---|---|---|---|---|
| 1 OCTET | 1 OCTET | 2 OCTETS | 2 OCTETS | 2 OCTETS | 4 OCTETS | 4 OCTETS | 4 OCTETS | 4 OCTETS |

| MEAN DATA RATE | MAXIMUM BURST SIZE | MINIMUM PHY RATE | PEAK DATA RATE | DELAY BOUND | SURPLUS BANDWIDTH ALLOWANCE |
|---|---|---|---|---|---|
| 4 OCTETS | 4 OCTETS | 4 OCTETS | 4 OCTETS | 1 OCTET | 1 OCTET |

TRAFFIC SPECIFICATION ELEMENT

FIG. 5
PRIOR ART

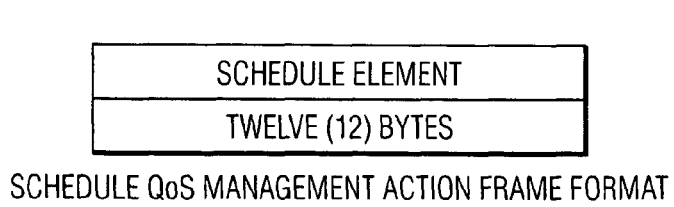

SCHEDULE QoS MANAGEMENT ACTION FRAME FORMAT

FIG. 7

| BITS 0-3 | BIT 4 | BITS 5-6 | BIT 7 | BITS 8-15 | USAGE |
|---|---|---|---|---|---|
| TID | FEC | ACK POLICY | SCHEDULE ELEMENT | TXOP LIMIT IN UNITS OF 32 MICROSECONDS | QoS DATA TYPE FRAMES THAT INCLUDE CF-POLL SENT BY THE HC |
| TID | FEC | ACK POLICY | SCHEDULE ELEMENT | RESERVED | QoS DATA TYPE FRAMES WITHOUT CF-POLL SENT BY THE HC |
| TID | FEC | ACK POLICY | RESERVED | QUEUE SIZE IN UNITS OF 256 OCTETS | QoS DATA (NON-NULL) FRAMES SENT BY WSTAs |
| TID | 0 | ACK POLICY | RESERVED | TXOP DURATION REQUESTED IN UNITS OF 32 MICROSECONDS | QoS NULL FRAMES SENT BY WSTAs |
| TID | 1 | ACK POLICY | RESERVED | QUEUE SIZE IN UNITS OF 256 OCTETS | |
| TID | 0 | RESERVED | RESERVED | TXOP DURATION REQUESTED IN UNITS OF 32 MICROSECONDS | RR FRAMES |
| TID | 1 | RESERVED | RESERVED | QUEUE SIZE IN UNITS OF 256 OCTETS | |

QoS CONTROL FIELD

FIG. 8

APPARATUS AND METHOD FOR ANNOUNCING A PENDING QOS SERVICE SCHEDULE TO A WIRELESS STATION

PRIORITY CLAIM TO PROVISIONAL PATENT APPLICATION

This patent application claims priority to U.S. Provisional Patent Application Serial No. 60/409,693 filed on Sep. 10, 2002 and incorporated herein by reference for all purposes.

REFERENCE TO RELATED PATENT APPLICATION

This patent application is related to U.S. patent application Ser. No. 10/314,576 filed concurrently herewith and incorporated herein by reference for all purposes entitled "Apparatus and Method for Providing QoS Service Schedule and Bandwidth Allocation to a Wireless Station."

TECHNICAL FIELD OF THE INVENTION

The present invention is generally directed to communications systems, and, in particular, to an apparatus and method for announcing a pending Quality of Service (QoS) service schedule to a wireless station in a wireless network.

BACKGROUND OF THE INVENTION

The development of high quality multimedia devices, such as set-top boxes, high end televisions, digital televisions, personal televisions, storage products, personal digital assistants (PDAs), wireless Internet devices, etc., is leading to a variety of architectures and to more openness towards new features for these devices. The development of these new multimedia products ensures that the public will continue to increase its demand for multimedia services. Network designers and engineers are therefore continuing to design systems that are capable of meeting the increasing demand for both real time and non-real time multimedia transfer across integrated networks.

The Internet Protocol (IP)-based Internet provides a "best effort" data delivery service that does not guarantee any service level to the users. A "best effort" service over the IP network allows the complexity to stay at the end-hosts, so that the network can remain simple. The phenomenal growth of the Internet shows that this approach scales well.

On the other hand, in recent years, the IEEE 802.11 wireless local area network (WLAN) has emerged as a prevailing technology for the (indoor) broadband wireless access for mobile/portable devices. IEEE 802.11 can be considered a wireless version of "Ethernet" by virtue of supporting a "best effort" service. The IEEE 802.11 Working Group is currently defining a new supplement to the existing legacy 802.11 Medium Access Control (MAC) layer in order to support Quality of Service (QoS). The new 802.11e MAC will expand the 802.11 application domain by enabling such applications as voice and video services over wireless local area networks (WLANs).

The new IEEE 802.11e standard will constitute the industry's first true universal wireless standard supporting QoS. IEEE 802.11e will offer seamless interoperability across home, enterprise, and public access networking environments, yet still offer features that meet the unique needs of each type of network. Unlike other wireless initiatives, IEEE 802.11e is the first wireless standard that spans home and business environments by adding QoS features and multimedia support to the existing IEEE 802.11 standard, while maintaining full backward compatibility with the legacy standard.

The QoS support for multimedia traffic is critical to wireless home networks where voice, audio, and video will be delivered across multiple networked home electronic devices and personal computers. Broadband service providers view QoS and multimedia-capable home networks as an essential ingredient to offering residential customers value-added services such as video on demand, audio on demand, voice over IP and high speed Internet access.

In order to provide adequate service, some level of quantitative and qualitative determinations of the types of network services will be required. This requires adding some capability to the network to enable the network to distinguish traffic with strict timing requirements on delay, jitter and loss from other types of traffic. This is what the protocols for QoS provisioning are designed to achieve. QoS provisioning does not create bandwidth, but manages bandwidth more effectively to meet a wide range of application requirements. The goal of QoS provisioning is to provide some level of predictability and control beyond the current IP "best effort" service.

The presently existing IEEE 802.11e standard (D3.2 of July 2002) sets forth a protocol for negotiating QoS requirements for traffic streams. The D3.2 version of the IEEE 802.11e standard of July 2002 is hereby incorporated within this patent document by reference. The D3.2 version of the IEEE 802.11e standard of July 2002 will be referred to as the "D3.2 Standard." A scheduler in a hybrid coordinator has the responsibility for determining the service schedule for each wireless station (WSTA). The scheduling is carried out so that the individual pre-negotiated QoS requirements are met. In the D3.2 Standard the service schedule is retained within the hybrid coordinator and is not made known outside of the hybrid coordinator. The actual determination of the service schedule is an algorithmic issue and is not addressed by the D3.2 Standard.

Because the service schedule that is determined by the hybrid coordinator (in the D3.2 Standard) is not known to the wireless stations, each Quality of Service (QoS) wireless station (QSTA) does not know when to expect a traffic opportunity (TXOP) to either receive downlink traffic or send uplink traffic (or send sidelink traffic). This is a problem because it is advantageous for a wireless station to conserve power by frequently entering a "power save" mode (also referred to as a "sleep" mode). The wireless station is not able to send or receive traffic when the wireless station is in the "power save" mode.

If the wireless station had prior knowledge of the service schedule within the hybrid coordinator, then the wireless station could enter into a "power save" mode when transmission opportunities (TXOPs) are not scheduled by the hybrid coordinator.

The apparatus and method disclosed and claimed in U.S. patent application Ser. No. 10/314,576 solves this problem by causing the hybrid coordinator to send a QoS service schedule to the wireless station. The wireless station then uses the QoS service schedule to perform power management by entering a "power save" mode during times when the hybrid coordinator has not scheduled any transmission opportunities.

Assume that the wireless station is in a "power save" mode at a time when the hybrid coordinator needs to send a new QoS service schedule to the wireless station. In that case the wireless station will not be able to receive the new QoS service schedule until the wireless station leaves the "power save" mode. To avoid this problem the hybrid coordinator needs to prevent the wireless station from entering a "power save" mode whenever a QoS service schedule is pending for the wireless station.

There is therefore a need in the art for an apparatus and method that will enable a hybrid coordinator in a wireless network to announce to a wireless station that a QoS service schedule is pending for the wireless station.

SUMMARY OF THE INVENTION

The present invention generally comprises an apparatus and method for enabling a hybrid coordinator in a wireless network to announce to a wireless station that a QoS service schedule is pending for the wireless station.

In an advantageous embodiment of the present invention, the apparatus of the invention comprises a hybrid coordinator that is capable of (1) creating an announcement of a pending Quality of Service (QoS) service schedule for a wireless station and (2) sending the announcement of the pending QoS service schedule to the wireless station. Upon receipt of the announcement of a pending QoS service schedule, the wireless station delays entering a power save mode of operation until the wireless station receives the QoS service schedule or until a selected timeout period expires.

It is a primary object of the present invention to provide an apparatus and method for announcing to a wireless station in a wireless network the existence of a pending Quality of Service (QoS) service schedule for the wireless station.

It is another object of the present invention to provide an apparatus and method for causing a wireless station to delay entering a "power save" mode of operation until the wireless station has received a pending QoS service schedule or until a selected timeout period has expired.

It is an additional object of the present invention to provide an apparatus and method for creating in a hybrid coordinator of a wireless network an announcement of a pending Quality of Service (QoS) service schedule by setting a value of at least one bit in a QoS control field.

The foregoing has outlined rather broadly the features and technical advantages of the present invention so that those skilled in the art may better understand the Detailed Description of the Invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 5 illustrates a prior art frame format for an IEEE 802.11e Traffic Specification Element;

FIG. 7 illustrates an exemplary frame format for a Schedule QoS Management Action of the present invention;

FIG. 8 is a Quality of Service (QoS) control field showing a schedule element field of the present invention for a hybrid coordinator to announce to a wireless station that a QoS service schedule is pending for the wireless station.

DETAILED DESCRIPTION OF THE INVENTION

FIGS. 1 through 9, discussed below, and the various embodiments set forth in this patent document to describe the principles of the improved system and method of the present invention are by way of illustration only and should not be construed in any way to limit the scope of the invention. Those skilled in the art will readily understand that the principles of the present invention may also be successfully applied in any type of wireless network system.

Figure 1:
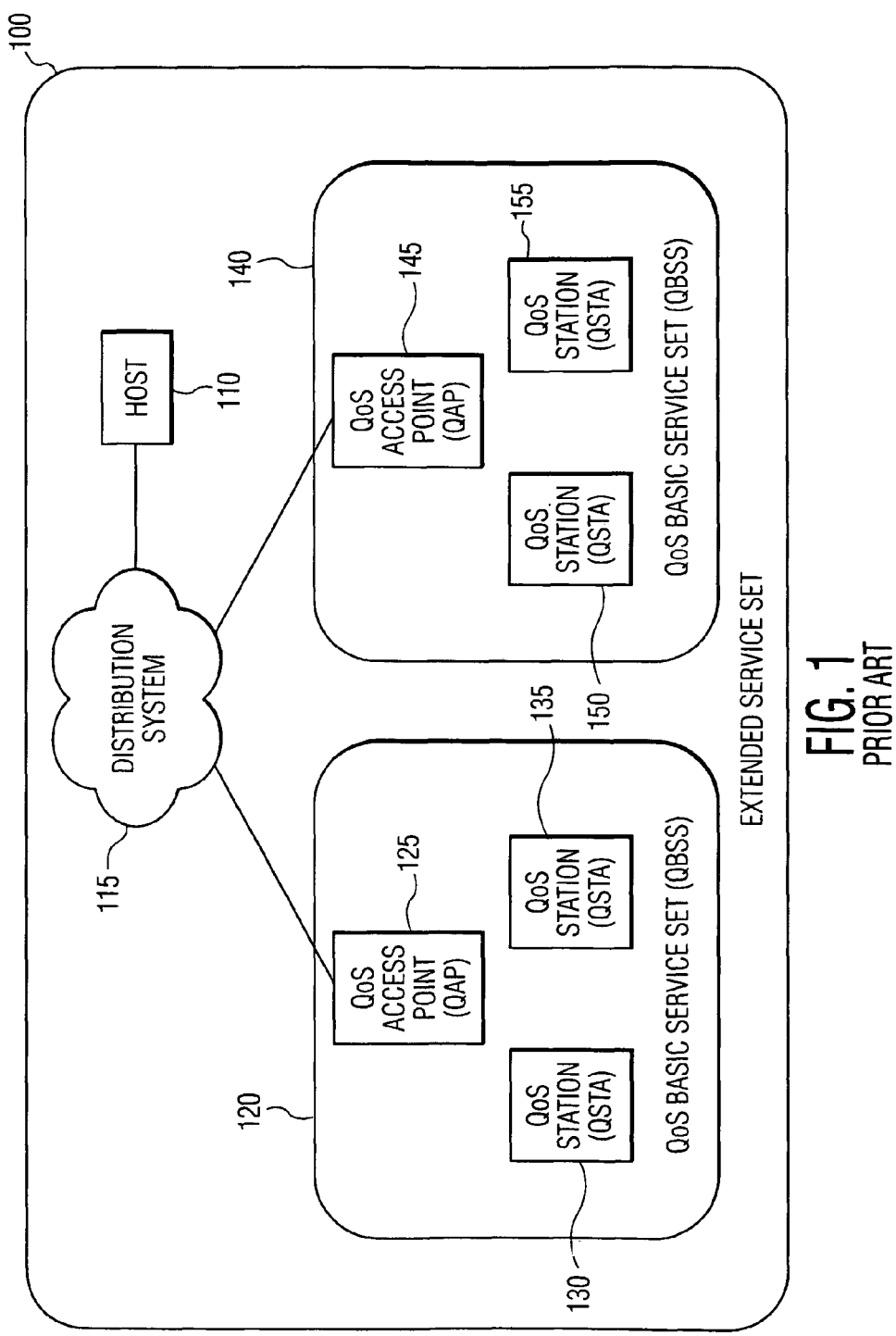
FIG. 1 illustrates an exemplary prior art extended service set of a wireless local area network (WLAN) comprising a host, a distribution system, a first Quality of Service (QoS) basic service set (QBSS), and a second Quality of Service (QoS) basic service set.

FIG. 1 illustrates an exemplary prior art extended service set 100 of a wireless local area network (WLAN). Extended service set 100 comprises host 110, distribution system 115, a first Quality of Service (QoS) basic service set (QBSS) 120, and a second Quality of Service (QoS) basic service set (QBSS) 140. A QoS basic service set (QBSS) comprises a number of wireless QoS stations (QSTA) that execute the same Medium Access Control (MAC) protocol and compete for access to the same shared medium. A QBSS may be isolated or it may be connected to a distribution system. Typically, a distribution system is a wired backbone local area network (LAN).

A Quality of Service (QoS) Access Point (QAP) is a wireless QoS station that is connected to a distribution system. The QAP functions as a bridge between a QBSS and the distribution system. The MAC protocol of a QBSS may be fully distributed or controlled by a central coordination function within the QAP of the QBSS. As shown in FIG. 1, QBSS 120 is connected to distribution system 115 through QAP 125 and QBSS 140 is connected to distribution system 115 through QAP 145.

Figure 2:
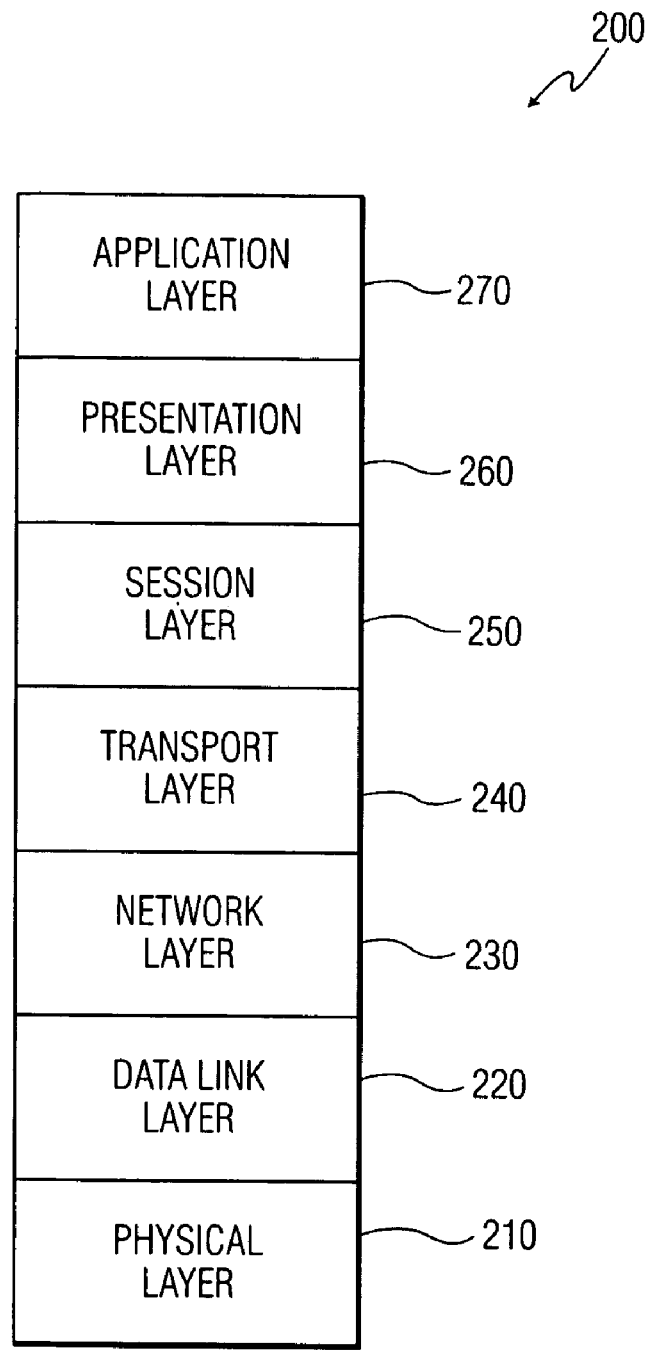
FIG. 2 illustrates seven prior art Open Systems Interconnection (OSI) network layers.

FIG. 2 illustrates seven prior art Open Systems Interconnection (OSI) network layers. These layers are well known in the art and are included here for reference. The first layer is Physical Layer 210, the second layer is Data Link Layer 220, the third layer is Network Layer 230, the fourth layer is Transport Layer 240, the fifth layer is Session Layer 250, the sixth layer is Presentation Layer 260, and the seventh layer is Application Layer 270.

Figure 3:
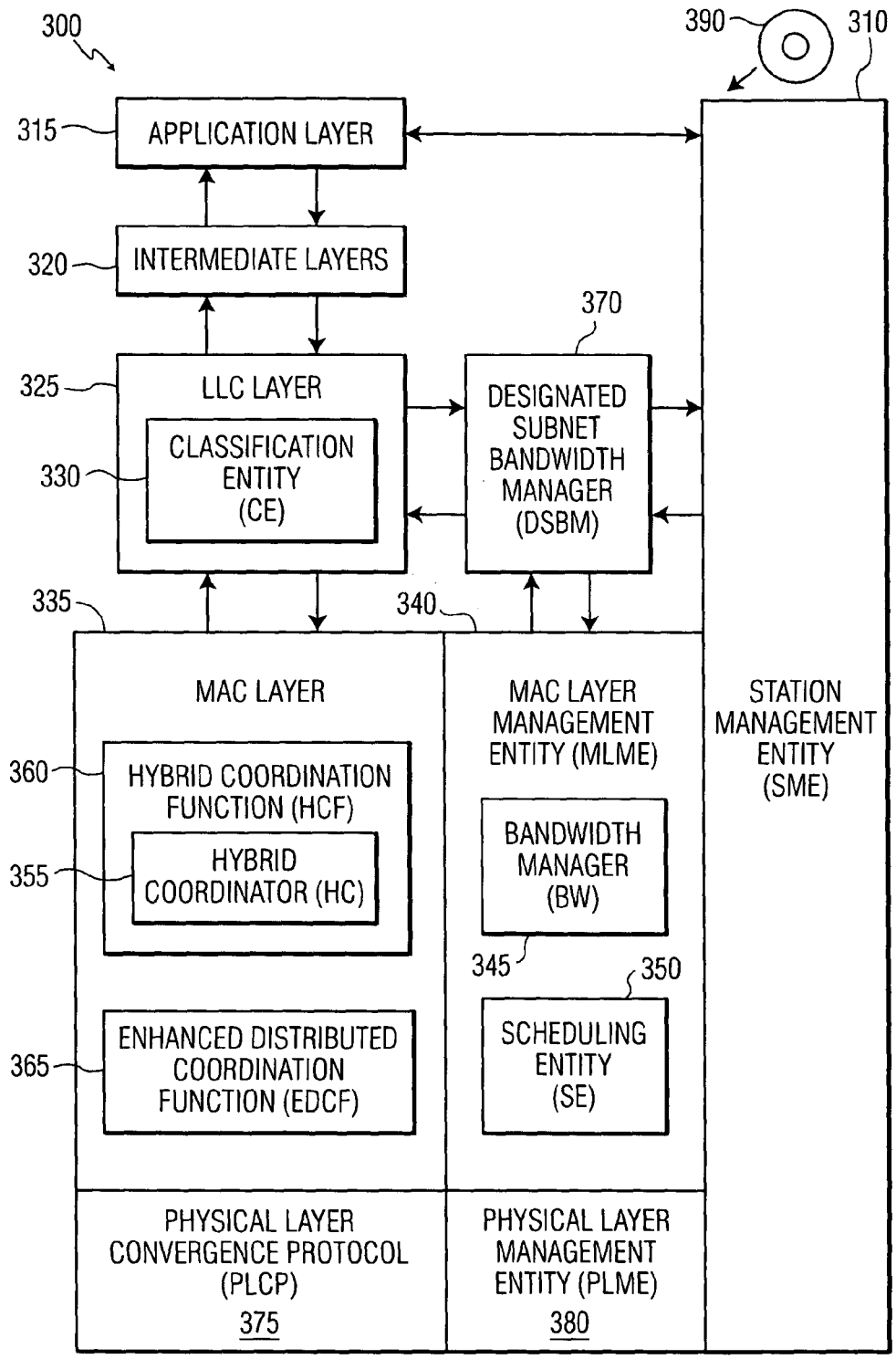
FIG. 3 illustrates an exemplary architecture of a Quality of Service (QoS) wireless station in accordance with the principles of the present invention.

FIG. 3 illustrates an exemplary architecture 300 of a Quality of Service (QoS) wireless station (QSTA) in accordance with the principles of the present invention. Many of the elements of this architecture are well known in the art. Station Management Entity (SME) 310 extends from the Application Layer to the Physical Layer. The Physical Layer is represented in FIG. 3 by Physical Layer Convergence Protocol (PLCP) 375 and Physical Layer Management Entity (PLME) 380. MAC Layer 335 is located above the Physical Layer Convergence Protocol (PLCP) 375. MAC Layer Management Entity (MLME) 340 is located above the Physical Layer Management Entity (PLME) 380.

The Logical Link Control Layer (LLC Layer) 325 is located above MAC Layer 335. LLC Layer 325 comprises Classification Entity (CE) 330. Intermediate Layers 320 are located above LLC Layer 325. Application Layer 315 is located above Intermediate Layers 320.

MAC Layer 335 comprises Hybrid Coordination Function (HCF) 360. Hybrid Coordination Function (HCF) 360 comprises Hybrid Coordinator (HC) 355. MAC layer 335 also comprises Enhanced Distributed Coordination Function (EDCF) 365. MAC Layer Management Function (MLME) 340 comprises Bandwidth Manager (BM) 345 and Scheduling Entity (SE) 350.

Designated Subnet Bandwidth Manager (DSBM) 370 is located above MAC Layer Management Function (MLME) 340. Designated Subnet Bandwidth Manager (DSBM) 370 is capable of communicating with LLC Layer 330, MAC Layer Management Function (MLME) 340, and Station Management Entity (SME) 310.

As will be more fully described, the Hybrid Coordinator 355 of the present invention is capable of providing a Quality of Service (QoS) service schedule and bandwidth allocation message to a Quality of Service (QoS) wireless station (e.g., QSTA 130) in wireless local area network 100.

The MAC layer 335 defines a Hybrid Coordination Function (HCF) 360 and an Enhanced Distributed Coordination Function (EDCF) 365. EDCF 365 is so named due to its root to the legacy DCF (i.e., the legacy IEEE 802.11 MAC). HCF 360 and EDCF 365 are usually located in the QoS Access Point (e.g., QAP 120).

EDCF 365 is based on a listen-before-talk protocol called Carrier Sense Multiple Access with Collision Avoidance (CSMA/CA) where a frame can be transmitted after listening to the channel for a random amount of time. It provides differentiated channel access to frames of different priorities as labeled by a higher layer. Due to the nature of the distributed contention based channel access along with the uncertainty of the wireless medium, EDCF 365 cannot guarantee any rigid QoS. However, it provides so-called "prioritized" QoS that can be useful for applications that can live with statistical frame losses. With EDCF 365, a single MAC 335 can have multiple queues that work independently, in parallel, for different priorities. Frames with different priorities are transmitted using different CSMS/CA contention parameters. That is, basically a frame with a higher priority is transmitted after listening to the channel for a probabilistically shorter period than frames with lower priorities. Note that the concept of a stream supported by EDCF 365 does not exist. Each individual frame is treated relatively based on its corresponding priority.

The controlled channel access of the HCF is based on a poll-and-response protocol in which a QSTA transmits its pending frame when it receives a polling frame from the HC. As the QSTAs contend for the channel according to the EDCF channel access, the HC is given the highest priority for the channel contention. That is, the HC is subject to winning the contention by listening to the channel for a shorter time than any other QSTA before its transmission of a downlink frame or a polling frame. By polling a QSTA, the HC grants a polled transmission opportunity (TXOP) to the QSTA, where a TXOP represents a specific amount of time during which the polled QSTA, called the TXOP holder, assumes control over the channel. The duration of a polled TXOP is specified in the particular polling frame. That is, during a polled TXOP, the TXOP holder can transmit multiple frames as long as the total duration for such transactions is not over the polled TXOP duration.

Thanks to the centrally controlled characteristics, the HCF can be used for the so-called "parameterized" QoS along with "prioritized" QoS. To support the parameterized QoS, the HC and the QSTA (or QSTAs) set up a (layer-2 wireless link) stream along with the traffic characteristics and QoS requirements of the particular stream. Once such a stream is set up, the HC attempts to grant the TXOPs to the corresponding QSTAs (if the stream is from QSTA to QSTA or from QSTA to HC) or transmit the frames (if the stream is from HC to QSTA) according to the agreed specification.

Figure 4:
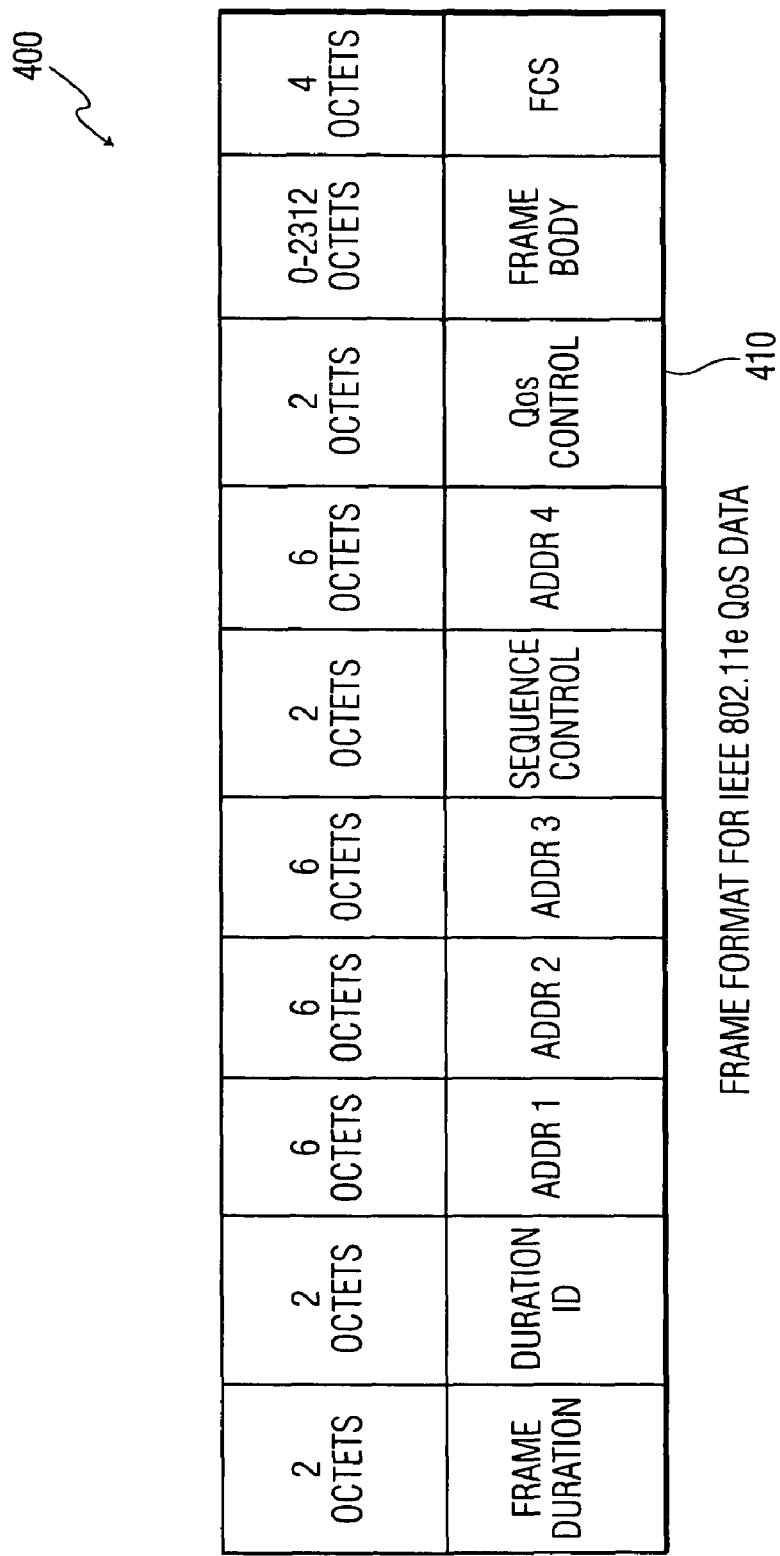
FIG. 4 illustrates a prior art frame format for IEEE 802.11e Quality of Service (QoS) data.

FIG. 4 illustrates a prior art frame format for IEEE 802.11e Quality of Service (QoS) data. Each single QoS data frame carries a Traffic Identifier (TID) value that identifies the priority of the frame for prioritized QoS or the corresponding traffic stream for parameterized QoS. To carry such information, the IEEE 802.11e QoS data frame header comprises a two (2) octet QoS control field 410 as shown in FIG. 4. The QoS control field uses four (4) bits to indicate the TID value and also carries some other QoS related information. For example, the status of the queue, which the specific frame was dequeued from, is also indicated to aid the TXOP grant scheduling of the HC.

Two types of QoS action management frames are defined to set up, modify, and delete traffic streams. The first type includes Add TS Request and Response QoS action frames that are used to set up or modify a QoS stream. The second type includes Delete TS Request and Response QoS action frames that are used to delete a QoS stream. Each QoS action management frame indicates the Traffic specification (TSPEC) information element to communicate the corresponding QoS requirements and traffic specifications.

FIG. 5 illustrates a prior art frame format for a Traffic Specification (TSPEC) Element. Traffic Specification (TSPEC) Element 500 contains the set of parameters that define the characteristics and QoS expectations of a unidirectional traffic stream, in the context of a particular wireless station (WSTA), for use by the Hybrid Coordinator (HC) and wireless stations (WSTAs), in support of a parameterized QoS traffic transfer. The Traffic Specification (TSPEC) Element information field comprises the items shown in FIG. 5. Traffic Specification (TSPEC) Element 500 allows a set of parameters more extensive than may be needed, or may be available, for any particular instance of parameterized QoS traffic. The fields are set to zero (0) for any unspecified parameter values.

The presently existing IEEE 802.11e standard (D3.2 of July 2002) sets forth a protocol for negotiating QoS requirements for traffic streams. The D3.2 version of the IEEE 802.11e standard of July 2002 will be referred to as the "D3.2 Standard." A scheduler in the Hybrid Coordinator has the responsibility for determining the service schedule for each wireless station (WSTA). The scheduling is carried out so that the individual pre-negotiated QoS requirements are met. In the D3.2 Standard the service schedule is retained within the Hybrid Coordinator and is not made known outside of the Hybrid Coordinator. The actual determination of the service schedule is an algorithmic issue and is not addressed by the D3.2 Standard.

Because the service schedule that is determined by the Hybrid Coordinator (in the D3.2 Standard) is not known to the wireless stations, each Quality of Service (QoS) wireless station (QSTA) does not know when to expect a traffic opportunity (TXOP) to either receive downlink traffic or send uplink traffic (or send sidelink traffic). This is a problem because it is advantageous for a wireless station (e.g., QSTA 130) to conserve power by frequently entering a "power save" mode (also referred to as a "sleep" mode). The wireless station is not able to send or receive traffic when the wireless station is in the "power save" mode. If the wireless station had prior knowledge of the service schedule within the Hybrid Coordinator, then the wireless station could enter into a "power save" mode when transmission opportunities (TXOPs) are not scheduled by the Hybrid Coordinator.

The apparatus and method disclosed and claimed in U.S. patent application Ser. No. 10/314,576 solves this problem by providing the schedule information within the Hybrid Coordinator to the wireless station by sending a Quality of Service (QoS) service schedule and bandwidth allocation message to the wireless station. The wireless station may use the schedule information for (1) power level management, or (2) prior scheduling of internally queued data, or (3) any other purpose.

Figure 6:
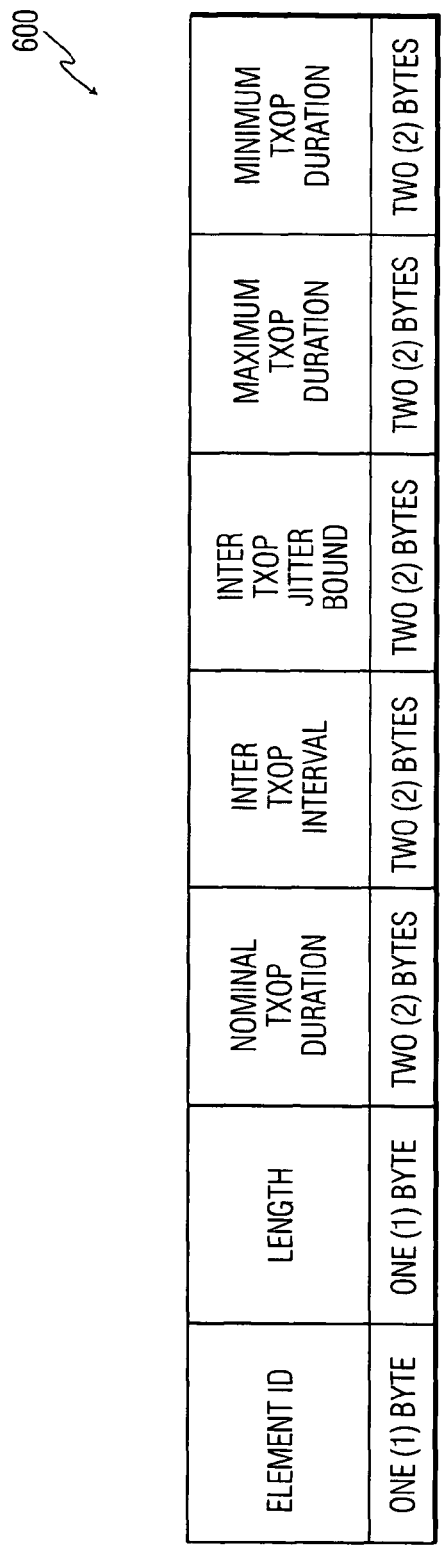
FIG. 6 illustrates an exemplary Schedule Element of the present invention.

The QoS service schedule and bandwidth allocation message comprises a Schedule Element 600 as shown in FIG. 6. Schedule Element 600 comprises the following information: Element Identification (ID), Length, Nominal TXOP Duration, Inter TXOP Interval, Inter TXOP Jitter Bound, Maximum TXOP Duration, and Minimum TXOP Duration. Schedule Element 600 is sent to the wireless station in a Schedule QoS Management Action Frame 700 as shown in FIG. 7.

The Schedule QoS Management Action Frame 700 may be sent from the Hybrid Coordinator to the wireless stations either periodically or aperiodically. The Schedule QoS Management Action Frame 700 may also be sent from the Hybrid Coordinator to the wireless stations either only one time or a selected number of times. The Schedule QoS Management Action Frame 700 is sent to a mobile station when there is at least one admitted traffic stream that originates at the wireless station or at least one admitted traffic stream to be delivered to the wireless station.

The Hybrid Coordinator may send a Schedule QoS Management Action Frame 700 to the wireless station whenever the schedule changes. A service schedule that is received by the wireless station remains valid until it is overwritten by a more recently received service schedule.

Assume that the wireless station is in a "power save" mode at a time when the Hybrid Coordinator needs to send a new QoS service schedule to the wireless station. In that case the wireless station will not be able to receive the new QoS service schedule until the wireless station leaves the "power save" mode. To avoid this problem the Hybrid Coordinator needs to prevent the wireless station from entering a "power save" mode whenever a QoS service schedule is pending for the wireless station.

The apparatus and method of the present invention solves this problem by enabling the Hybrid Coordinator to announce to the wireless station that a QoS service schedule is pending for the wireless station. The Hybrid Coordinator announces the pending QoS service schedule through a QoS control field. A QoS control field is one of the fields that are present in all QoS Data Frames (including polls or frames sent by a wireless station).

FIG. 8 illustrates a Quality of Service (QoS) control field 800 showing a Schedule Element field of the present invention for a hybrid coordinator to announce to a wireless station that a QoS service schedule is pending for the wireless station. QoS Control Field 800 is a sixteen (16) bit field that identifies the Traffic Category (TC) or Traffic Stream (TS) to which a frame belongs and other various type of QoS related information about the frame. The usage of certain subfields and the layouts of QoS control field 800 are shown in FIG. 8.

When there is a QoS service schedule pending for a wireless station, the Hybrid Coordinator sets Bit 7 (the "Schedule Element") to a logical value of one ("1") in QoS control field 800 in an outgoing QoS Data Frame. The wireless station senses that Bit 7 is set to a logical value of one ("1") and therefore does not enter the "power save" mode after the scheduled transmission opportunity (TXOP) has ended. The wireless station remains in an operational mode and waits to receive the pending QoS service schedule. The wireless station waits for a maximum wait time period that is measured by a selected value of time such as "dot11ScheduleTimeout." If the wireless station does not receive the pending QoS service schedule within the maximum wait time period, then the wireless station may enter the "power save" mode.

Figure 9:
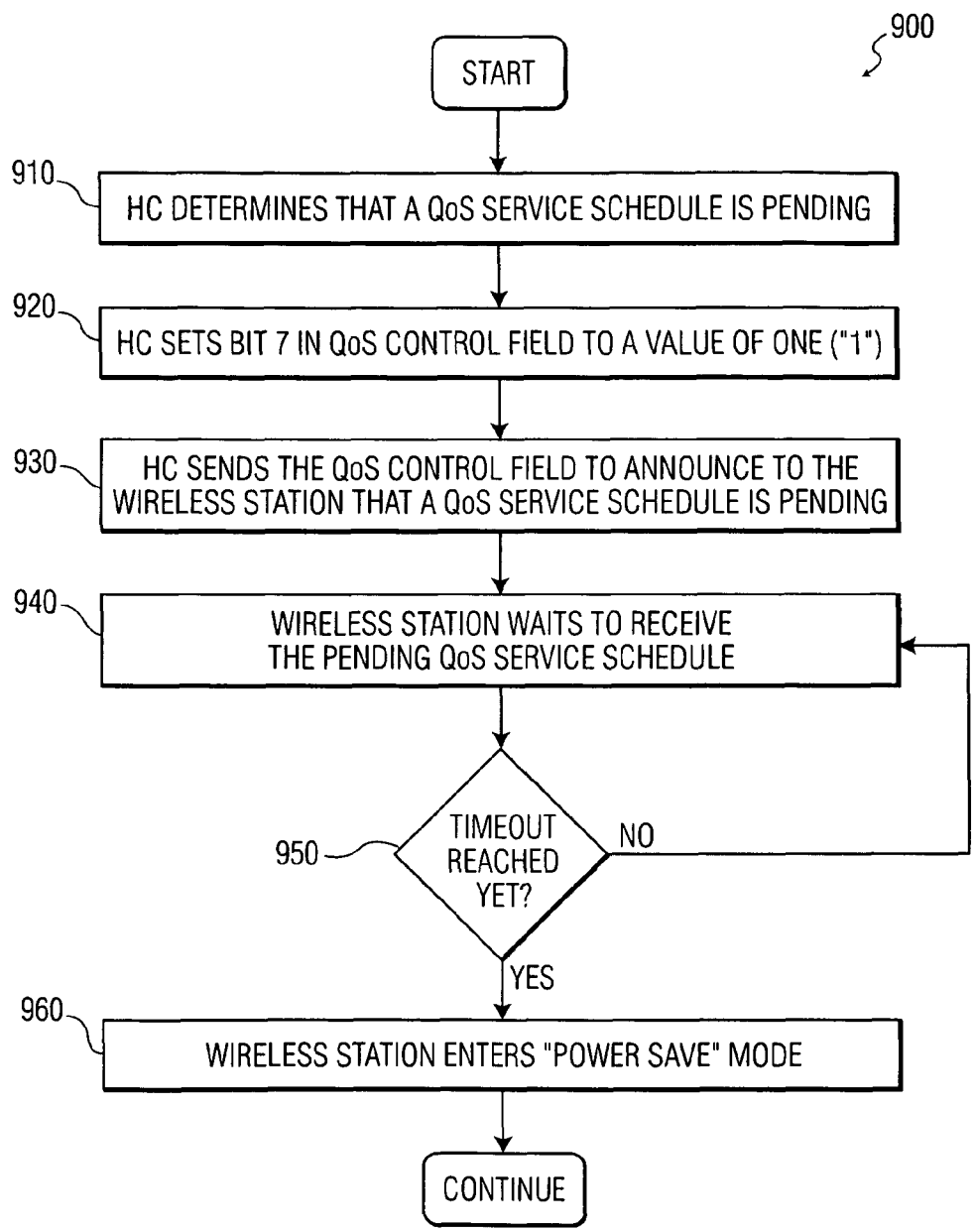
FIG. 9 is a flow chart illustrating an advantageous embodiment of a method of the present invention in which a hybrid coordinator announces to a wireless station that a QoS service schedule is pending for the wireless station.

FIG. 9 is a flow chart illustrating an advantageous embodiment of a method of the present invention in which a Hybrid Coordinator announces to a wireless station that a QoS service schedule is pending for the wireless station. The steps shown in FIG. 9 are collectively referred to with the reference numeral 900. For the purposes of illustration the wireless station (WSTA) will be assumed to be QSTA 130 and the Hybrid Coordinator (HC) will be assumed to be Hybrid Coordinator 355 co-located in QoS Access Point (QAP) 125.

The Hybrid Coordinator (HC) determines that a QoS service schedule is pending for a wireless station (step 910). The Hybrid Coordinator (HC) sets Bit 7 in the QoS control field 800 to a logical value of one ("1") to indicate the presence of a pending QoS service schedule (step 920). The Hybrid Coordinator (HC) then sends to the wireless station a QoS Data Frame with Bit 7 set in the QoS control field 800 to announce to the wireless station that a QoS service schedule is pending (step 930).

The wireless station then waits to receive the pending QoS service schedule (step 940). The wireless station continues to check the accumulated wait time against the maximum wait time ("timeout" value) (decision step 950). If the timeout value has not been reached the wireless station continues to wait. After the timeout value is reached the wireless station enters the "power save" mode (step 960).

The steps of the method of the present invention may be carried out by computer-executable instructions stored on a computer-readable storage medium such as a DVD or a CD-ROM. Such a computer-readable storage medium is represented schematically in FIG. 3 as CD-ROM disk 390.

Although the present invention has been described in detail, those skilled in the art should understand that they can make various changes, substitutions and alterations herein without departing from the spirit and scope of the invention in its broadest form.

What is claimed is:

1. A method for announcing a pending Quality of Service (QoS) service schedule to a wireless station in a wireless network comprising the steps of:
    creating in a hybrid coordinator of said wireless network an announcement of said pending Quality of Service (QoS) service schedule for said wireless station;
    sending said announcement of said pending QoS service schedule from said hybrid coordinator to said wireless station;
    receiving said announcement of said pending QoS service schedule in said wireless station; and
    delaying an entry of said wireless station into a power save mode of operation until said wireless station has received said pending QoS service schedule.

2. The method as claimed in claim 1 further comprising the steps of:
    sending an acknowledgement from said wireless station to said hybrid coordinator that said wireless station has received said pending QoS service schedule from said hybrid coordinator;
    receiving said acknowledgement in said hybrid coordinator; and putting said pending QoS service schedule into effect in said hybrid coordinator.

3. The method as claimed in claim 1 further comprising the step of:
    delaying an entry of said wireless station into a power save mode of operation until said wireless station has waited for a period of time equal to a selected timeout value.

4. The method as claimed in claim 3 wherein said selected timeout value equals dot11ScheduleTimeout.

5. The method as claimed in claim 1 wherein said step of creating in said hybrid coordinator of said wireless network an announcement of said pending Quality of Service (QoS) service schedule for said wireless station comprises the step of: setting a value of at least one bit in a QoS control field to a logical value of one.

6. The method as claimed in claim 5 wherein said step of sending said announcement of said pending QoS service schedule from said hybrid coordinator to said wireless station comprises the step of: sending a QoS data frame containing said QoS control field from said hybrid coordinator to said wireless station.

7. A wireless network capable of announcing a pending Quality of Service (QoS) service schedule to a wireless station in said wireless network, wherein said wireless network is capable of:
    creating in a hybrid coordinator of said wireless network an announcement of said pending Quality of Service (QoS) service schedule for said wireless station; and
    sending said announcement of said pending QoS service schedule from said hybrid coordinator to said wireless station;
    receiving said announcement of said pending QoS service schedule in said wireless station; and
    delaying an entry of said wireless station into a power save mode of operation until said wireless station has received said pending QoS service schedule.

8. The wireless network as claimed in claim 7 wherein said wireless network is further capable of:
    sending an acknowledgement from said wireless station to said hybrid coordinator that said wireless station has received said pending QoS service schedule from said hybrid coordinator;
    receiving said acknowledgement in said hybrid coordinator; and
    putting said pending QoS service schedule into effect in said hybrid coordinator.

9. The wireless network as claimed in claim 7 wherein said wireless network is further capable of: delaying an entry of said wireless station into a power save mode of operation until said wireless station has waited for a period of time equal to a selected timeout value.

10. The wireless network as claimed in claim 9 wherein said selected timeout value equals dot11ScheduleTimeout.

11. The wireless network as claimed in claim 7 wherein said step of creating in said hybrid coordinator of said wireless network an announcement of said pending Quality of Service (QoS) service schedule for said wireless station comprises the step of: setting a value of at least one bit in a QoS control field to a logical value of one.

12. The wireless network as claimed in claim 11 wherein said step of sending said announcement of said pending QoS service schedule from said hybrid coordinator to said wireless station comprises the step of: sending a QoS data frame containing said QoS control field from said hybrid coordinator to said wireless station.

13. Computer-executable instructions stored on a computer-readable storage medium for announcing a pending Quality of Service (QoS) service schedule to a wireless station in a wireless network, said computer-executable instructions comprising the steps of:
    creating in a hybrid coordinator of said wireless network an announcement of said pending Quality of Service (QoS) service schedule for said wireless station; and
    sending said announcement of said pending QoS service schedule from said hybrid coordinator to said wireless station;
    receiving said announcement of said pending QoS service schedule in said wireless station; and
    delaying an entry of said wireless station into a power save mode of operation until said wireless station has received said pending QoS service schedule.

14. The computer-executable instructions stored on a computer-readable storage medium as claimed in claim 13 wherein said computer-executable instructions further comprise the steps of:
    sending an acknowledgement from said wireless station to said hybrid coordinator that said wireless station has received said pending QoS service schedule from said hybrid coordinator;
    receiving said acknowledgement in said hybrid coordinator; and
    putting said pending QoS service schedule into effect in said hybrid coordinator.

15. The computer-executable instructions stored on a computer-readable storage medium as claimed in claim 13 wherein said computer-executable instructions further comprise the step of: delaying an entry of said wireless station into a power save mode of operation until said wireless station has waited for a period of time equal to a selected timeout value.

16. The computer-executable instructions stored on a computer-readable storage medium as claimed in claim 13 wherein said selected timeout value equals dot11ScheduleTimeout.

17. The computer-executable instructions stored on a computer-readable storage medium as claimed in claim 13 wherein said step of creating in said hybrid coordinator of said wireless network an announcement of said pending Quality of Service (QoS) service schedule for said wireless station comprises the step of: setting a value of at least one bit in a QoS control field to a logical value of one.

18. The computer-executable instructions stored on a computer-readable storage medium as claimed in claim 17 wherein said step of sending said announcement of said pending QoS service schedule from said hybrid coordinator to said wireless station comprises the step of: sending a QoS data frame containing said QoS control field from said hybrid coordinator to said wireless station.

* * * * *